A. CARTER.
STOREHEAT LUNCH BOX.
APPLICATION FILED JUNE 4, 1907.
934,041.
Patented Sept. 14, 1909.
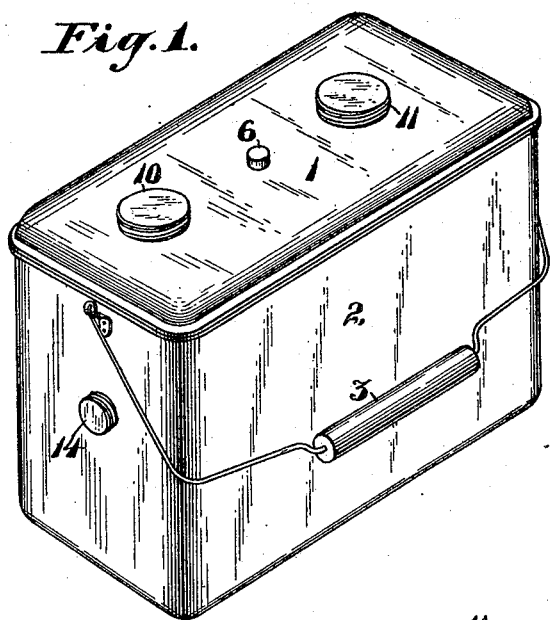
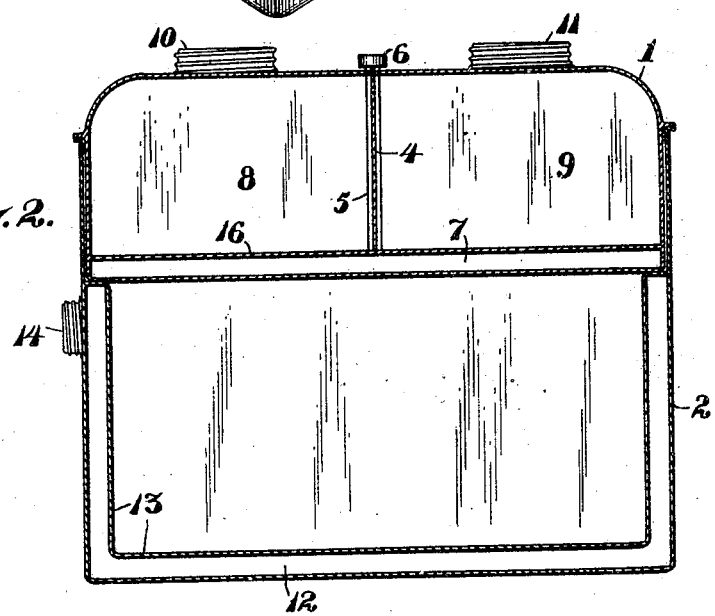
WITNESSES:
F. C. Fliedner
U. O. Lenhart.
INVENTOR
A. Carter
BY
Carlos P. Griffin
ATTORNEY

UNITED STATES PATENT OFFICE.

ALBERT CARTER, OF LOS ANGELES, CALIFORNIA, ASSIGNOR TO STOREHEAT MANUFACTURING COMPANY, OF PHOENIX, ARIZONA TERRITORY, A CORPORATION OF ARIZONA TERRITORY (INCORPORATED IN 1907).

STOREHEAT LUNCH-BOX.

934,041.  Specification of Letters Patent.  Patented Sept. 14, 1909.

Application filed June 4, 1907. Serial No. 377,261.

*To all whom it may concern:*

Be it known that I, ALBERT CARTER, a citizen of the United States, and a resident of the city and county of Los Angeles, State of California, have invented certain new and useful Improvements in Storeheat Lunch-Boxes, of which the following is a specification in such full and clear terms as will enable those skilled in the art to construct and use the same.

The object of this invention is to produce a lunch box that will contain compartments for the storage of a material that will heat the materials in the box when the lunch is to be eaten, and at the desire of the person using the same. This material is heated at the time the lunch box is filled and then the box is carried to the place where it is desired to open the same, and when the person wishes to eat the lunch he allows the material in the heat storage compartment to begin to crystallize by opening one of the plugs in the heat storage compartment, when the bucket will be at once heated to about 150 to 160 degrees.

In the drawings in which like numerals of reference refer to like parts throughout, Figure 1 is a perspective view of the bucket, and Fig. 2 is a longitudinal vertical section of the same.

The lunch bucket 2 is of the common rectangular shape and has a cover 1, and a handle 3. The cover is divided in the center by the partition 4 which extends transversely across the top, while a second partition 16 extends across the bottom of the cover. The top is thus divided into three compartments 7, 8 and 9, a small tube 5 extending from the bottom compartment 7 to the top of the bucket, said tube having a cap 6. Each of the other compartments 8 and 9 have caps 10 and 11, said caps being of such size as to allow the soup and coffee to be easily poured out of the top. The bottom compartment is intended for the heat storage material and the screw top on the same is for the purpose of allowing the air to have access to the same when it is desired to heat the lunch.

The main part of the bucket 2 is divided into two compartments by the partition 13 which extends around the sides of the bucket and across the bottom thus leaving a compartment 12 to which access is had through the cap 14, said cap being of the same type as those used on the cover of the bucket.

The lower part of the bucket is intended for carrying bread, meats and pie, the heat storage material being placed permanently in the compartment 12. The cover is used for the purpose of carrying tea, coffee, or soup, and the heat storage material is placed in the compartment 7.

Having thus described my invention what I claim as new and desire to secure by Letters Patent of the United States is as follows:

1. In a lunch box, the combination of a double walled receptacle the inner wall thereof being spaced from the outer wall at the bottom and sides of the receptacle and forming with the outer wall a compartment for heat storage material, said inner wall terminating below the top of the outer wall and forming a ledge, means for introducing a heat storage material into said compartment, and a cover for said receptacle and adapted to rest on said ledge, substantially as described.

2. In a lunch box, the combination of a double walled receptacle the inner wall thereof being spaced from the outer wall at the bottom and sides of the receptacle and forming with the outer wall a compartment for the storage of a heat retaining material, said inner wall terminating below the top of the outer wall and forming a ledge, means whereby a heat retaining material may be introduced into said compartment, and a cover adapted to rest on said ledge, said cover having a compartment for the storage of a heat retaining material extending over its entire bottom area, and having two other compartments the bottoms of which are formed by the top of the heat retaining compartment, substantially as described.

In testimony whereof I have hereunto set my hand in the presence of the two subscribing witnesses this 24 day of May A. D. 1907, at Los Angeles, Cal.

ALBERT CARTER.

Witnesses:
C. HUEHNER,
J. M. DIMSMOOR.